July 29, 1952 L. L. BURNS, JR., ET AL 2,605,354
MECHANICAL FILTER
Filed March 22, 1949

INVENTOR
LESLIE L. BURNS, JR. AND
WALTER VAN B. ROBERTS.
BY Harry Tunick
ATTORNEY Patented July 29, 1952

2,605,354

UNITED STATES PATENT OFFICE 2,605,354

MECHANICAL FILTER

Leslie L. Burns, Jr., and Walter van B. Roberts, Princeton, N. J., assignors to Radio Corporation of America, a corporation of Delaware Application March 22, 1949, Serial No. 82,834

12 Claims. (Cl. 178—44)

This invention relates to mechanical filters, and more particularly to band pass filters of the electromechanical, magnetostrictively-driven type.

An object of this invention is to improve the frequency-response characteristic of a band pass filter of the mechanical type.

Another object is to provide a means for increasing the attenuation of a mechanical band pass filter at a chosen or desired frequency location outside the desired pass band.

A further object is to steepen the sides of the frequency-response characteristic of a mechanical-type band pass filter.

A still further object is to provide a simple, inexpensive yet effective means for effecting high attenuation in a band pass filter at a frequency usually outside the pass band, but which may be inside such band if desired.

The foregoing and other objects of the invention will be best understood from the following description of an exemplification thereof, reference being had to the accompanying drawing, wherein.

A filter is usually used between amplifier tubes or other electronic amplifier devices. For greatest stage gain, the filter should be matched to the input and output impedances of such tubes. This invention is concerned with electromechanical filters of the magnetostrictively-driven type. The drive and pickup coils on the ends of such a filter are likely to be of rather low impedance and the power factor high, because of the electromechanical coupling to the filter and because of eddy current losses in the end tanks of the filter. A tunable impedance matching device should, therefore, be used.

For tuning the filter drive or pickup coils, or for matching the impedance of such coils to that of the tubes with which they are used, separate resonant impedance matching networks, each consisting of an auxiliary coil and a condenser, are used, such networks being connected to the corresponding drive or pickup coil. In accordance with this invention, a mechanically resonant body, tuned to a predetermined resonant frequency, is used as a tuning core for the auxiliary coil of the impedance matching network. This resonant body acts to sharply reduce the transmission through the filter at the resonant frequency of such body. By the use of such a body, very high attenuation may be produced at a predetermined frequency which may be located at any desired point outside the pass band of the filter. In this way, rejection of a particular frequency may be produced, and the arrangement of this invention may be termed a "rejector."

Figure 1:
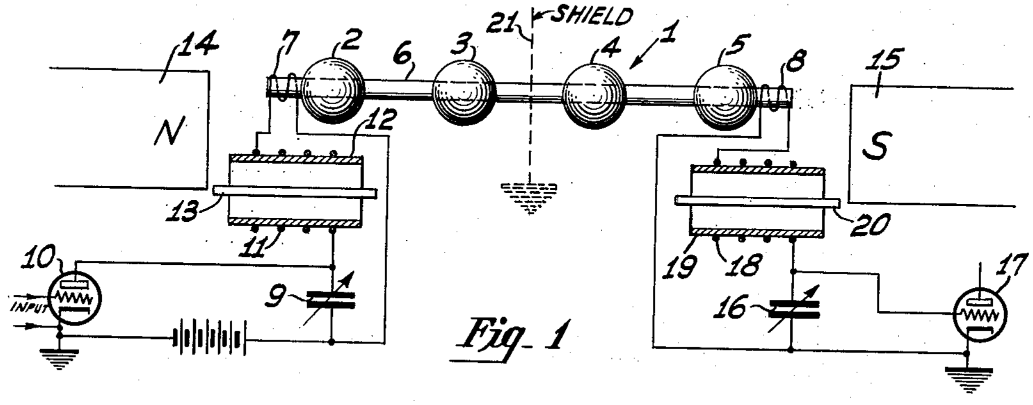
Fig. 1 is a schematic representation of one embodiment of this invention.

Now referring to Fig. 1, numeral 1 indicates generally an electromechanical filter. This filter may be, for example, of the multiple-section ball-coupled type, as more particularly described in our copending application, Serial No. 84,372, filed March 30, 1949. In an example given as a specific embodiment, the mechanical filter 1 consisted of four ball-coupled sections, the $\frac{5}{16}''$ diameter steel balls 2, 3, 4 and 5 being soldered on a length 6 of .004'' wall nickel tubing of .06'' outer diameter at intervals of .92'' between centers of the balls, the end sections being .46'' long. Thus, each of the four sections of the filter can be considered to be a ball centrally mounted on a length of tubing which is .92'' long.

Although the invention has been illustrated and described above as being utilized in connection with a multiple-section ball-coupled filter, and although specific dimensional values have been previously given, it is desired to be made clear at this juncture that the invention is equally applicable to numerous types of magnetostrictive electromechanical band pass filters, such as any of the types disclosed in the aforementioned copending application. In other words, the invention is applicable to various types of frequency selective filters. In fact, the invention is not limited to magnetostrictively-driven filters, nor even to electromechanical filters; the invention can also be used in conjunction with electrical band pass filters of any type, the only requirements being that an impedance matching network be provided between the band pass filter and another impedance, and that an auxiliary coil or inductance costnitute part of this matching network. This statement will become more clearly apaprent as the description proceeds.

To proceed with the description of the specific embodiment given above as an example, the particular filter 1 described above passed a band from 99 to 101.3 kilocycles, and at 98.6 kilocycles the output was "down" to 1/15 of the output at 99 kilocycles. This is a very rapid cut-off by ordinary standards, but the filter was intended to be used for single side band selection, where an extremely rapid cut-off is needed.

A driving coil or electromechanical conversion means 7 is coupled to one of the end sections of tubing element 6, while a pickup coil or electromechanical conversion means 8 is coupled to the other end section of said elements. Coils 7 and 8 are of rather low impedance and of low effective "Q" because of the electromechanical coupling of such coils to the filter element 6 and because of eddy current losses in the short end tanks of the filter. Filters of the type described are usually used between amplifier tubes, which have rather high input and output impedances, or between other devices or elements which have high impedances.

For greatest stage gain, or in other words, for the maximum efficiency of transfer of energy, the coils 7 and 8 should be matched to the impedances of the devices between which such coils are connected. For this purpose, tunable impedance matching networks are provided between the filter coils and the driving and pickup tube stages, each of these impedance matching networks consisting of an L-section LC network, the L of each such network being tuned by a ferromagnetic tuning core.

A variable condenser 9, which is the C of the LC network, is connected across the plate-cathode or output circuit of a driver amplifier tube 10, the cathode of this tube being grounded as shown. The lower grounded plate of condenser 9 is connected directly to one end of driving coil 7, while the upper or high potential plate of such condenser is connected to one end of an auxiliary coil 11 which is mounted on a suitable coil form 12 made of insulating material. The auxiliary coil 11 serves as the L of the LC impedance matching network, which is located between the band pass filter 1 and tube 10 and which matches the high output impedance of such tube to the filter drive coil 7. The other end of coil 11 is connected to that end of driving coil 7 opposite to the grounded end thereof. Thus, the two coils 7 and 11 are connected in series across the driving source 10 output, and condenser 9 is also connected across said output.

According to the present invention, a ferrite resonator rod 13, tuned to 98.4 kilocycles, is placed inside auxiliary coil 11, to serve as a tuning core to tune such coil. In other words, rod 13 is made of a ferromagnetic material and helps to provide the appropriate value of inductance for coil 11, the appropriate value L of inductance being that necessary for giving the desired impedance transformation or match between driving coil 7 and driving tube 10.

The tubing element 6 is made of magnetostrictive material, and magnetostrictive drive and pickup of said element is effected through coils 7 and 8, as disclosed in the aforementioned copending application. To provide longitudinal polarizing magnetic flux through element 6, magnets 14 and 15, poled as indicated, are provided adjacent the opposite ends of element 6. Of course, if torsional drive of the electromechanical filter were desired, the magnets would be arranged somewhat differently with respect to element 6, as described in said copending application.

Resonator rod 13, being made preferably of a ferrite material, is also magnetostrictive. Magnet 14 is of such a size and is placed in such a position that it provides polarizing flux for core or rod 13. Again, although the rod resonator 13 has been described above as being of ferrite, this has been done only by way of example. It is to be understood that said rod resonator may be made of other materials, such as nickel, which are ferromagnetic and which have good magnetostrictive activity. However, ferrite is preferred because it has low losses and can act efficiently as a tuning core.

Resonator rod 13 is placed inside auxiliary coil 11, as previously described, and said coil is therefore coupled to such resonator to serve as the driving coil therefor. Rod 13 is mounted in coil 11 in such a way that it is free to mechanically vibrate with respect thereto, and in the example given is tuned to be resonant at 98.4 kilocycles. The rod 13, being magnetostrictive and being properly polarized, will be caused to mechanically vibrate when the frequency of the alternating voltage in coil 11 is near its resonant frequency of 98.4 kilocycles.

At the resonant frequency of the resonator 13, the effective resistance or impedance of its coil 11 clearly increases or becomes very high, due to the vibration of such resonator. The apparent impedance of coil 11 is greatly altered at the resonant frequency of rod 13, thus throwing the resonant impedance matching network 9, 11 so far out of adjustment as to provide a large impedance mismatch of the coil 7 to the tube 10 at this frequency, greatly impairing the efficiency of energy transfer to driving coil 7 at said frequency and also greatly impairing the efficiency of operation of the filter 1 at and near the rod resonant frequency. In effect, then, the arrangement of this invention, including rod 13 and coil 11, absorbs energy at the rod resonant frequency and substantially prevents it from reaching and being applied to driving coil 7 of the filter 1, due to the large impedance mismatch provided at and near such rod resonant frequency. Considering the arrangement of Fig. 1 as a whole, the rod 13 with its coil 11 may be termed a "rejector," since it in effect acts to reject energy of a predetermined frequency or to substantially prevent energy of such frequency from reaching filter 1.

The arrangement of the particular embodiment being described operated to reduce the filter output to about 1/300 of maximum at a frequency of 98.6 kilocycles, and to an immeasurably small value for all frequencies below 98.6.

It will be seen, from the foregoing, that the rod resonator 13 provides a single means for tuning the impedance matching network 9, 11 between a band pass filter 1 and a tube 10, and also for improving the attenuation outside the pass band of the filter 1 by introducing a frequency of very high attenuation at any desired location outside the pass band.

Figure 2:
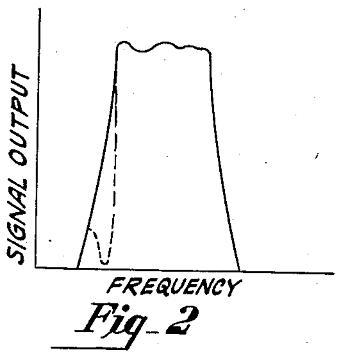
Fig. 2 is a set of curves illustrating certain characteristics of operation of Fig. 1.

Fig. 2 illustrates the very desirable results obtained by the use of this invention. In this figure, the solid line curve represents the frequency-output characteristic of an electromechanical band pass filter such as filter 1, without the rejector of this invention, while the dotted-line curve represents the characteristics of the same filter utilizing the invention described above, that is, using a rejector in the input or driving matching coil 11. By comparing the solid-line with the dotted-line characteristic in Fig. 2, it may be seen that, by utilizing a rejector according to this invention, the attenuation of the band pass filter has been greatly increased at a desired frequency location outside the desired pass band, that the sides of the frequency-response characteristics of the filter have been steepened, and that these desirable ends have been effectuated by a relatively simple and inexpensive means. In particular, from the valves given hereinabove it may be seen that without the rejector of this invention, at 98.6 kilocycles the filter output was "down" to only 1/15 of the maximum output at 99 kilocycles, while with the rejector, at 98.6 kilocycles the filter output was "down" to 1/300 of the maximum output at 99 kilocycles.

It might be thought that still sharper cut off could be obtained by using a rejector resonator frequency still closer to the lower edge of the band, for instance a frequency of 98.9 kilocycles, it being recalled that the pass band of the particular filter being described extends from 99 to 101.3 kilocycles. However, it must be remembered that the resonator 13 is effective over a finite narrow band, and it would be undesirable to locate it so close to the pass band as to affect the filter output within such pass band. On the other hand, if the magnetostrictive activity of the rod 13 is too much reduced, as by weakening the magnetic field on it, it does not have sufficient rejector effect even at its exact resonant frequency. A compromise of the sort described above has been found to give very satisfactory results.

The compromise is most easily effected by a cut and try process, but some predetermination may be made from the following considerations. The mechanical Q of a ferrite rod 13 in a coil 11 as shown in Fig. 1 is on the order of 1000. Hence, said rod will be appreciably excited over a range of frequencies on the order of 1/10 of 1% wide. To avoid interference with the response inside the band, the ferrite frequency should therefore be kept outside the band by considerably more than 1/20 of 1% of the operating frequency. In the example given above, the ferrite was tuned a little more than 1/2 of 1% below the band edge. Perhaps it could have been a little closer, but as the result was quite satisfactory it was not considered desirable to make it any closer, as any variation in frequency of either the filter 1 or the ferrite 13 (due, for example, to temperature change or to change in the magnetic field on the ferrite) might cause interference with the pass band.

Where a second rejection point is desired, a second ferrite rod resonator may be placed in the output or pickup voltage stepup circuit, as shown in Fig. 1. Here, the high-impedance grid or input circuit of the following amplifier stage is connected to the low impedance pickup coil 8 through an L-section LC resonant impedance matching network which has circuit connections similar to the impedance matching network on the input side of the filter, previously described, but the impedance values of which may be different. A variable condenser 16 is connected across the grid-cathode or input circuit of a pickup amplifier tube 17, the cathode of this tube being grounded as shown. The lower grounded plate of condenser 16 is connected directly to one end of pickup coil 8, while the upper or high potential plate such condenser is connected to one end of an auxiliary coil 18 which is mounted on a suitable coil form 19 made of insulating material. The auxiliary coil 18 serves as the L of the LC impedance matching network, the C of which is provided by condenser 16, this network being located between the band pass filter 1 and tube 17 and matching the high input impedance of such tube to the filter pickup coil 8. The other end of coil 18 is connected to that end of pickup coil 8 opposite to the grounded end thereof. Thus, the two coils 8 and 18 are connected in series across the input circuit of tube 17, and condenser 16 is also connected across such input circuit.

A ferrite or other magnetostrictive resonator rod 20, tuned to a desired second rejection point which may be at the upper edge of the pass band of filter 1 or which may be at any other predetermined frequency, is placed inside auxiliary coil 18. Magnet 15 is of such a size and is placed in such a position that it provides polarizing flux for core or rod 20. Coil 18 is coupled to rod resonator 20 and serves as the magnetostrictive driving coil therefor.

Rejector 20 and coil 18 act together, in the same manner as do rejector 13 and coil 11, to provide a second frequency rejection point at and near the resonant frequency of rod 20. Thus, rod resonator 20 provides a single means for tuning the impedance matching network 16, 18 between a band pass filter 1 and a tube 17, and also for improving the attenuation outside the pass band of the filter 1 by introducing a second frequency of very high attenuation at any desired location outside the pass band.

In most cases, it is desirable to provide a grounded electrostatic and electromagnetic shield 21 between the driving coil 7 and the pickup coil 8. A shielding structure very suitable for this purpose is disclosed in the copending Roberts application, Serial No. 76,586, filed February 15, 1949.

Figure 3:
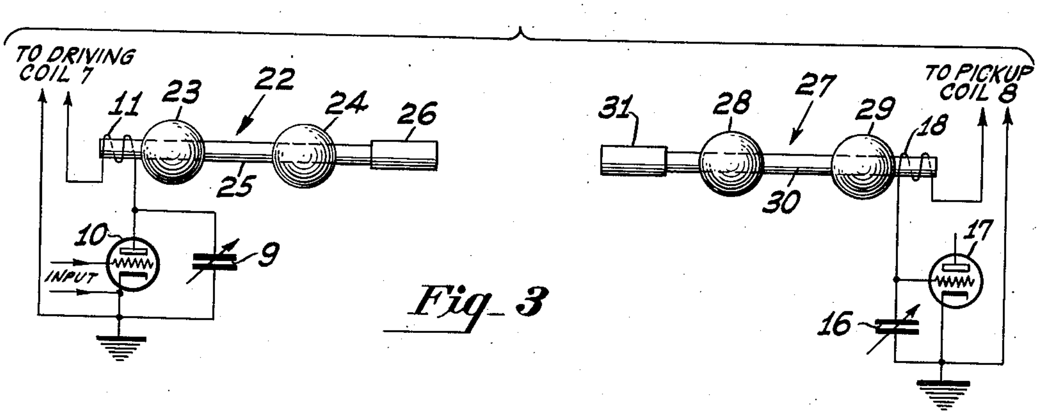
Fig. 3 is a schematic representation of a modification.

It has been found that the simple rod resonators such as 13 and 20 described above, although they operate over a finite width band, provide rejection characteristics so very sharp that the width of the rejection band is almost nil. For some applications of the invention, this may be an undesirable condition. It is therefore within the scope of this invention to replace the simple rod resonators of Fig. 1 by band pass filters for rejection purposes. Fig. 3 illustrates such a modification.

Referring now to Fig. 3, wherein the illustration is simplified and wherein elements the same as those of Fig. 1 are denoted by the same reference numerals, elements 11 and 9 are the respective components of the L-section LC resonant impedance matching network on the input side for connecting the driving coil of the main filter (not shown) to the output impedance of tube 10, while elements 18 and 16 are the respective components of the L-section LC resonant impedance matching network on the output side for connecting the pickup coil of the main filter to the input impedance of tube 17.

Inductively coupled to auxiliary coil 11 of the input impedance matching network, in such a way that said coil will serve as the driving coil thereof, is one tank end of a band pass filter denoted generally by 22. Filter 22 is in general somewhat similar to the filter 1 of Fig. 1, in that the former is also of the multiple-section ball-coupled type. However, filter 22 consists of two ball-coupled filter sections, the two balls 23 and 24 being soldered on a length 25 of nickel tubing. Also, the filter 22, instead of having a pickup coil coupled to the end tank thereof opposite from the input coil 11, has a piece 26 of lossy material, such as the lossy plastic material known as Viscoloid, firmly attached to the end of tubing length 25 opposite to that end to which driving coil 11 is coupled. By this construction, mechanical vibrations of the electromechanical band pass filter 22, in the band passed by said filter, are converted into heat in member 26, rather than being taken off for utilization by means of a pickup coil as in main filter 1.

Similarly, inductively coupled to auxiliary coil 18 of the output impedance matching network, in such a way that said coil will serve as the driving coil thereof, is one tank end of a band pass filter denoted generally by 27. Filter 27 is similar to filter 22, and consists of two ball-coupled filter sections, the two balls 28 and 29 being soldered on a length 30 of nickel tubing. A piece 31 of Viscoloid or other lossy material is firmly attached, as by cementing, to the end of tubing length 30 opposite to that end to which driving coil 18 is coupled. Mechanical vibrations of the band pass filter 27, in the band passed by such filter, are converted into heat in member 31, rather than being taken off for utilization by means of a pickup coil as in the main filter.

The operation of the Fig. 3 embodiment is very similar to that of the Fig. 1 embodiment previously described, the main difference being that in Fig. 3 each of the rejector filters 22 and 27 is in effect resonant over a band, as more fully described in our aforementioned joint application, rather than at substantially only a single frequency, as in Fig. 1. In other words, throughout the pass band of each of the rejector filters 22 and 27, the impedance of its coupled coil, 11 or 18 as the case may be, becomes resistive, thus producing an impedance mismatch in the corresponding impedance matching network and a consequent absorption of energy in such bands, thus in effect preventing energy of frequencies lying within these bands from being applied to the main filter. Thus, rejector action is produced throughout the pass bands of filters 22 and 27.

Figure 4:
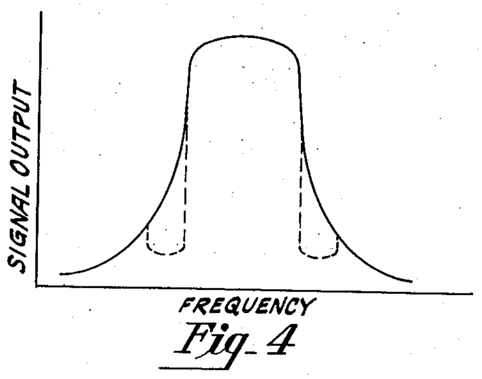
Fig. 4 is a set of curves illustrating certain characteristics of operation of Fig. 3.

Fig. 4 illustrates a frequency-output characteristic such as might be obtained with the arrangement of Fig. 3. The solid-line curve represents the characteristic of the main filter without the use of rejectors, while the dotted-line curve represents the results which might be expected from the use of the Fig. 3 embodiment, that is, with two band pass filters as rejectors, these rejectors 22 and 27 having their pass bands at opposite edges of the pass band of the main filter. The steepening of the sides of the main band pass filter characteristic by the use of rejector band pass filters should become apparent from an examination of the dotted-line characteristic of Fig. 4.

It should be noted, from the above detailed description, that in Fig. 3, as well as in Fig. 1, one and the same magnet may provide magnetic fields both for the rejector resonator and for the end or tank element of the main filter. Thus, the present invention requires no extra parts at all, merely the grinding to a desired frequency of the core already useful for tuning the coil of the impedance matching network. If used in combination with an electrical filter, which use is within the scope of this invention, the magnet for polarizing the rejector resonator would be an extra element.

What we claim to be our invention is as follows:

1. In combination, a frequency selective mechanical filter having electromechanical conversion means coupled thereto, an impedance matching network connecting said conversion means to another impedance, said network including an inductance, and a magnetostrictive resonator coupled to said inductance to be mechanically driven by alternating voltages appearing therein, thereby altering the effective impedance of said inductance and the impedance match between said conversion means and said other impedance within a range of frequencies about a frequency predetermined by the physical constants of said resonator.

2. In combination, a frequency selective mechanical filter having electromechanical conversion means coupled thereto, an impedance matching network connecting said conversion means to another impedance, said network including an inductance, and a magnetostrictively-driven resonant band pass filter coupled to said inductance to be mechanically driven by alternating voltages appearing therein, thereby altering the effective impedance of said inductance and the impedance match between said conversion means and said other impedance over a band of frequencies predetermined by the physical constants of said band pass filter.

3. In combination, an electromechanical band pass filter having electromechanical conversion means coupled thereto, an impedance matching network connecting said conversion means to another impedance, said network including an inductance, and a magnetostrictive resonator coupled to said inductance to be mechanically vibrated by alternating voltages appearing therein, thereby altering the effective impedance of said inductance and the impedance match between said conversion means and said other impedance within a range of frequencies about a frequency predetermined by the physical constants of said resonator, said frequency range having a location in the frequency spectrum outside the pass band of said filter but near one edge thereof.

4. In combination, an electromechanical band pass filter having electromechanical conversion means coupled thereto, an impedance matching network connecting said conversion means to another impedance, said network including an inductance, and a sharply resonant magnetostrictive resonator coupled to said inductance to be mechanically vibrated by alternating voltages appearing therein, thereby altering the effective impedance of said inductance and the impedance match between said conversion means and said other impedance within a narrow range of frequencies about a frequency predetermined by the physical constants of said resonator, said frequency range having a location in the frequency spectrum outside the pass band of said filter but near one edge thereof.

5. In combination, an electromechanical band pass filter having electromechanical conversion means coupled thereto, an impedance matching network connecting said conversion means to another impedance, said network including an inductance, and a magnetostrictively-driven resonant band pass filter coupled to said inductance to be mechanically vibrated by alternating voltages appearing therein, thereby altering the effective impedance of said inductance and the impedance match between said conversion means and said other impedance over a band of frequencies predetermined by the physical constants of said second-named filter, said frequency band having a location in the frequency spectrum outside the pass band of said first-named filter but near one edge thereof.

6. In combination, a frequency selective filter having input connections and output connections, a separate impedance matching network coupled to each of said connections for connecting said filter to another impedance, said networks each including an inductance, and a separate magnetostrictive resonator coupled to each of said inductances to be mechanically driven by alternating voltages appearing in its corresponding inductance.

7. In combination, a frequency selective mechanical filter having electromechanical conversion means coupled thereto, an L-section resonant LC impedance matching network connecting said conversion means to another impedance, and a magnetostrictive resonator coupled to the inductance of said network to be mechanically driven by alternating voltages appearing therein.

8. In combination, a magnetostrictively-driven electromechanical filter having driving and pick-up coils coupled thereto, an impedance matching network coupled to at least one of said coils for connecting such coil to another impedance, said network including an inductance, and a magnetostrictive resonator coupled to said inductance to be mechanically driven by alternating voltages appearing therein.

9. In combination, a magnetostrictively-driven electromechanical filter having driving and pick-up coils coupled thereto, a separate impedance matching network coupled to each of said coils for connecting such coils to corresponding impedances, said networks each including an inductance, and a separate magnetostrictive resonator coupled to each of said inductances to be mechanically driven by alternating voltages appearing in its corresponding inductance.

10. In combination, a magnetostrictively-driven electromechanical filter having driving and pick-up coils coupled thereto, a separate impedance matching network coupled to each of said coils for connecting such coils to corresponding impedances, said networks each including an inductance, and a separate sharply resonant magnetostrictive resonator coupled to each of said inductances to be mechanically driven by alternating voltages appearing in its corresponding inductance.

11. In combination, a magnetostrictively-driven electromechanical filter having driving and pick-up coils coupled thereto, a separate L-section resonant LC impedance matching network coupled to each of said coils for connecting such coils to corresponding impedances, and a separate sharply resonant magnetostrictive resonator coupled to the inductances of each of said networks to be mechanically driven by alternating voltages appearing in its corresponding inductance.

12. In combination, a magnetostrictively-driven electromechanical filter having driving and pick-up coils coupled thereto, a separate L-section resonant LC impedance matching network coupled to each of said coils for connecting such coils to corresponding electron discharge tube stages, and a separate sharply resonant magnetostrictive resonator coupled to the inductance of each of said networks to be mechanically driven by alternating voltages appearing in its corresponding inductance.

LESLIE L. BURNS, JR.
WALTER VAN B. ROBERTS.

REFERENCES CITED

The following references are of record in the file of this patent:

UNITED STATES PATENTS

| Number | Name | Date |
|---|---|---|
| 1,876,163 | Prienchenfried | Sept. 6, 1932 |
| 2,166,359 | Lakatos | July 18, 1939 |
| 2,167,078 | Latakos | July 25, 1939 |
| 2,501,488 | Adler | Mar. 21, 1950 |